(12) United States Patent
Kaneko et al.

(10) Patent No.: US 7,363,142 B2
(45) Date of Patent: Apr. 22, 2008

(54) DEVICE AND METHOD FOR CONTROLLING IGNITION TIMING OF INTERNAL COMBUSTION ENGINE

(75) Inventors: Rihito Kaneko, Nishikamo-gun (JP); Kenji Kasashima, Nishikamo-gun (JP); Masatomo Yoshihara, Toyota (JP); Kenji Senda, Okazaki (JP); Yuichi Takemura, Anjo (JP); Shuhei Oe, Kariya (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 0 days.

(21) Appl. No.: 11/678,805

(22) Filed: Feb. 26, 2007

(65) Prior Publication Data

US 2007/0215108 A1  Sep. 20, 2007

(30) Foreign Application Priority Data

Mar. 20, 2006  (JP)  ............................. 2006-076756

(51) Int. Cl.
*G06F 19/00*  (2006.01)
*F02P 5/00*  (2006.01)

(52) U.S. Cl. ............... 701/111; 123/406.34; 123/406.38

(58) Field of Classification Search ................ 701/101, 701/111, 114, 115; 123/406.21, 406.29, 123/406.33–406.38
See application file for complete search history.

(56) References Cited

U.S. PATENT DOCUMENTS

| | | | | | |
|---|---|---|---|---|---|
| 4,711,212 A | * | 12/1987 | Haraguchi et al. | ..... | 123/406.38 |
| 5,188,080 A | * | 2/1993 | Sakakibara et al. | .... | 123/406.38 |
| 5,355,853 A | * | 10/1994 | Yamada et al. | ........ | 123/406.38 |
| 6,688,286 B2 | * | 2/2004 | Kokubo et al. | ........ | 123/406.33 |
| 6,877,482 B2 | * | 4/2005 | Kinose | .................. | 123/406.29 |

FOREIGN PATENT DOCUMENTS

| | | |
|---|---|---|
| JP | 4-76249 | 3/1992 |
| JP | 2003-21032 | 1/2003 |
| JP | 2004-353531 | 12/2004 |
| JP | 2005-23902 | 1/2005 |

* cited by examiner

*Primary Examiner*—John T. Kwon
(74) *Attorney, Agent, or Firm*—Oblon, Spivak, McClelland, Maier & Neustadt, P.C.

(57) ABSTRACT

An engine ECU executes a program including the steps of: calculating a magnitude value LOG(V) from a magnitude V detected using a knock sensor; calculating a median value V(50) and a standard deviation a of calculated magnitude values LOG(V); calculating a knock determination level V(KD) that is a value obtained by adding the product of standard deviation a and a coefficient U(3) to median value V(50); and when knock determination level V(KD) is greater than the product of determination value V(KX) and a coefficient K, decreasing determination value V(KX). When a knock magnitude N calculated using magnitude V is greater than determination value V(KX), ignition timing is retarded.

15 Claims, 14 Drawing Sheets

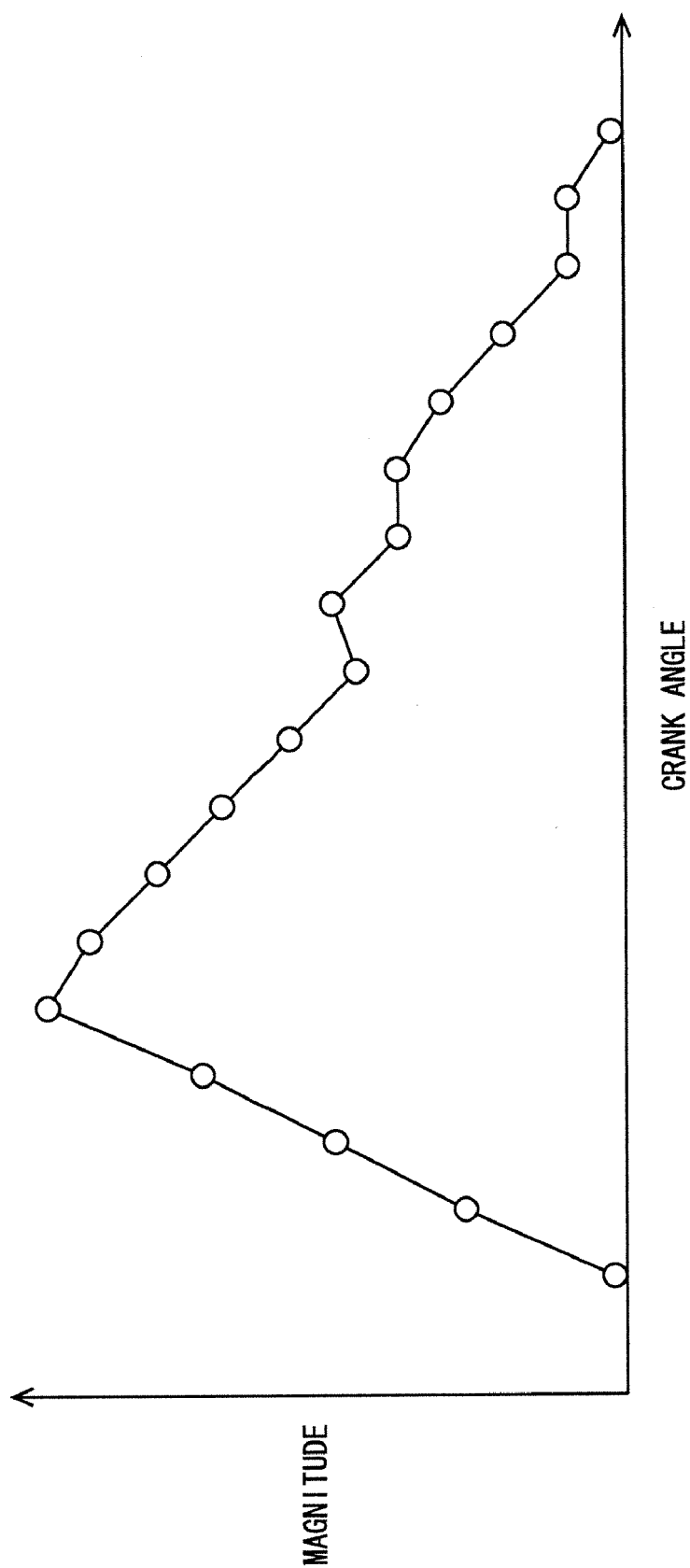
F I G. 4

F I G. 7

|   |   |   |
|---|---|---|
| A | C | B |
| B | C | B |
| A | 906571<br>B | A |

KL(2)

INTAKE AIR AMOUNT KL

KL(1)

NE(1)　　NE(2)

ENGINE SPEED NE

F I G. 16
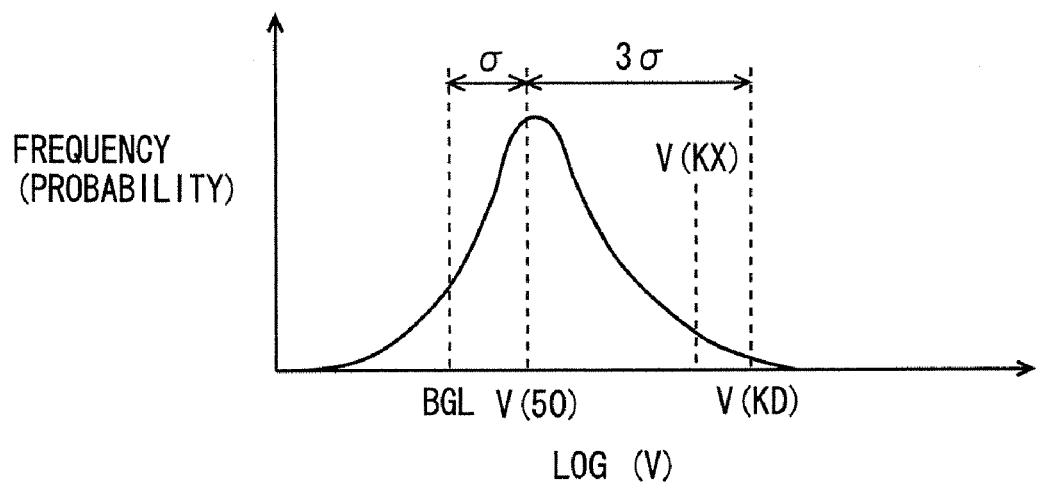
F I G. 17
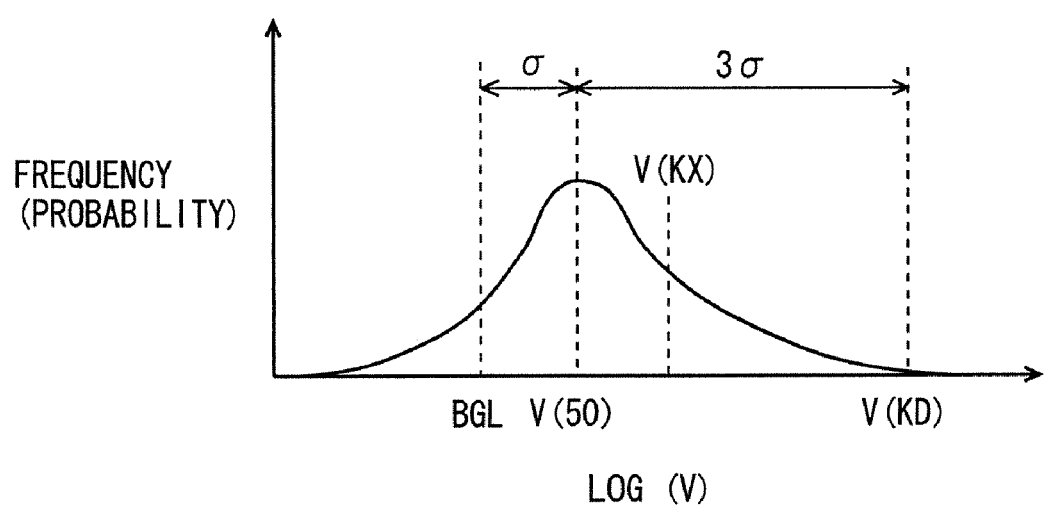

DEVICE AND METHOD FOR CONTROLLING IGNITION TIMING OF INTERNAL COMBUSTION ENGINE

This nonprovisional application is based on Japanese Patent Application No. 2006-076756 filed with the Japan Patent Office on Mar. 20, 2006, the entire contents of which are hereby incorporated by reference.

BACKGROUND OF THE INVENTION

1. Field of the Invention

The present invention relates to device and method for controlling ignition timing of an internal combustion engine, and particularly to a technique of controlling ignition timing based on whether knocking is present or absent.

2. Description of the Background Art

Conventionally, various methods of determining whether knocking (knock) is present or absent have been proposed. For example, by detecting magnitude of vibration occurring in an internal combustion engine and comparing the magnitude with a threshold value, whether knocking is present or absent is determined. However, in an internal combustion engine, besides vibration due to knocking, vibration due to an intake valve or an exhaust valve sitting on its seat may occur. Vibration may also occur due to the actuation of an injector (in particular, an in-cylinder direct injector that directly injects fuel inside a cylinder) or a high-pressure pump that supplies fuel to the injector. When such vibration is detected as noise, it may not be possible to discriminate vibration due to knocking from vibration due to noise, based on magnitude of vibration. Accordingly, a technique of determining whether knocking is present or absent in consideration of both magnitude of vibration and a waveform shape has been proposed.

A knock control device for an internal combustion engine disclosed in Japanese Patent Laying-Open No. 2003-021032 includes: a knock sensor detecting knocking in an internal combustion engine; a statistical processing portion statistically processing an output signal detected by the knock sensor; a first temporal determination portion determining occurrence of knocking based on a processing result by the statistical processing portion; a second temporal determination portion determining occurrence of knocking based on a waveform shape of the output signal detected by the knock sensor; and a final knock determination portion finally determining occurrence of knocking based on the knock temporal determination of the first temporal determination portion and the knock temporal determination of the second temporal determination portion. When both of the first and second temporal determination portions determine that knocking has occurred, the final knock determination portion finally determines that knocking has occurred. In the first temporal determination portion, by comparing the maximum value of the output signals detected by the knock sensor with a knock determination level calculated based on the processing result by the statistical processing portion, whether or not knocking has occurred is determined. A knock determination level is corrected to a value obtained by subtracting a set value $\Delta V$ from the knock determination level or to a value obtained by adding the product of a value A greater than "1" and set value $\Delta V$ to the knock determination level, based on the occurrence frequency of knocking. In a distribution of values LOG(V), which are obtained by logarithmically converting maximum values V of knock sensor output signals, it is assumed that the highest 10% values, the highest 50% values, and the highest 90% values are V10, V50, and V90, respectively. When knocking frequently occurs, they are in the relationship of V10/V50>V50/V90. Accordingly, when V10/V50>V50/V90, set value $\Delta V$ is subtracted from the knock determination level to correct the knock determination level. When V10/V50>V50/V90 is not satisfied, the product of "A" and set value $\Delta V$ is added to the knock determination level to correct the knock determination level.

According to the knock control device disclosed by the publication, a knock temporal determination by a statistical processing program and a knock temporal determination by a waveform shape program are used, and only when both of the temporal determinations determine that knocking has occurred, it is finally determined that knocking has occurred. As a result, occurrence of knocking can precisely be determined even as to an output signal, which has been erroneously determined by a knock determination employing solely the statistical processing program or the waveform shape program.

However, even when whether knocking is present or absent is determined using the distribution of magnitudes (output signals of the knock sensor) of vibration occurring in the internal combustion engine as in the knock control device described in Japanese Patent Laying-Open No. 2003-021032, not always a determination value (knock determination level) is precisely corrected. When knocking occurs extremely frequently, both the highest 10% values and the highest 50% values can be great. Therefore, sometimes V10/V50>V50/V90 is not satisfied even though knocking frequently occurs. In such a case, even though knocking has occurred, the determination value (knock determination level) may be increased. Therefore, even though knocking has occurred, it may hardly be determined that knocking has occurred. Accordingly, ignition timing may be advanced and the occurrence of knocking cannot be suppressed.

SUMMARY OF THE INVENTION

An object of the present invention is to provide a device and the like for controlling ignition timing of an internal combustion engine that can suppress occurrence of knocking.

A device for controlling ignition timing of an internal combustion engine according to one aspect of the present invention includes a knock sensor detecting for a plurality of times a magnitude of vibration occurring in the internal combustion engine, and an operation unit connected to the knock sensor. The operation unit calculates a knock magnitude related to a magnitude of vibration due to knocking, in accordance with each magnitude detected by the knock sensor. The operation unit controls ignition timing of the internal combustion engine, based on a result of comparison between the knock magnitude and a predetermined first determination value. The operation unit calculates a median value and a standard deviation of the magnitudes detected by the knock sensor. When a second determination value calculated by adding a product of the standard deviation and a predetermined coefficient to the median value is greater than the first determination value, the operation unit corrects the first determination value so that the degree of ignition timing being retarded becomes greater.

According to the present invention, a magnitude of vibration occurring in the internal combustion engine is detected for a plurality of times. A knock magnitude related to a magnitude of vibration due to knocking is calculated, in accordance with each magnitude being detected. Based on a result of comparison between the knock magnitude and a predetermined determination value, ignition timing of the internal combustion engine is controlled. For example, if the knock magnitude is greater than the determination value, the ignition timing is retarded. If the knock magnitude is smaller than the determination value, the ignition timing is advanced. Meanwhile, if the determination value is excessively great relative to the magnitude of vibration occurring in the internal combustion engine, the detected magnitude can be smaller than the determination value even when knocking has occurred. In this case, the ignition timing is advanced and knocking can additionally occur. If knocking frequently occurs, the frequency of great magnitude being detected becomes higher. Accordingly, the median value and standard deviation of the magnitudes themselves become great. Therefore, when a second determination value obtained by adding a product of the standard deviation and a predetermined coefficient to the median value is greater than the first determination value, the first determination value is corrected so that the degree of ignition timing being retarded becomes greater. Thus, in a state where it can be regarded that knocking has frequently occurred, the determination value to be compared with the magnitude of vibration can be suppressed from becoming excessively great relative to the vibration occurring in the internal combustion engine. Accordingly, the ignition timing can easily be retarded. As a result, a device for controlling ignition timing of an internal combustion engine that can suppress occurrence of knocking can be provided.

Preferably, the operation unit further calculates a third determination value greater than the first determination value, based on the first determination value. When the second determination value is greater than the first determination value since the second determination value is greater than the third determination value, the operation unit corrects the first determination value so that the degree of the ignition timing being retarded becomes greater.

According to the present invention, the third determination value greater than the first determination value is calculated based on the first determination value. When the second determination value is greater than the first determination value since the second determination value is greater than the third determination value, the first determination value is corrected so that the degree of the ignition timing being retarded becomes greater. Thus, until the second determination value becomes greater than the third determination value, which is greater than the first determination value, the correction of the determination value can be suppressed. Therefore, undue correction of the determination value can be suppressed.

Further preferably, the operation unit calculates the third determination value by multiplying the first determination value by a predetermined value.

According to the present invention, the third determination value is calculated by multiplying the first determination value by a predetermined value. Thus, the third determination value greater than the first determination value can be obtained.

Further preferably, the operation unit calculates the third determination value by adding a predetermined value to the first determination value.

According to the present invention, the third determination value is calculated by adding a predetermined value to the first determination value. Thus, the third determination value greater than the first determination value can be obtained.

Further preferably, the operation unit controls the ignition timing to be retarded when the knock magnitude is greater than the first determination value, and the operation unit corrects the first determination value so that the first determination value becomes smaller.

According to the present invention, the ignition timing is retarded when the knock magnitude is greater than the first determination value. The first determination value is corrected to be smaller. Accordingly, the ignition timing can easily be retarded. As a result, occurrence of knocking can be suppressed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a chart showing a waveform of vibration in the engine;

FIG. 7 is a chart showing a map of a determination value V(KX) stored in the memory of the engine ECU;

FIG. 16 is a chart (No. 7) showing frequency distribution of magnitude values LOG(V);

FIG. 17 is a chart (No. 8) showing frequency distribution of magnitude values LOG(V);

DESCRIPTION OF THE PREFERRED EMBODIMENTS

Figure 1:
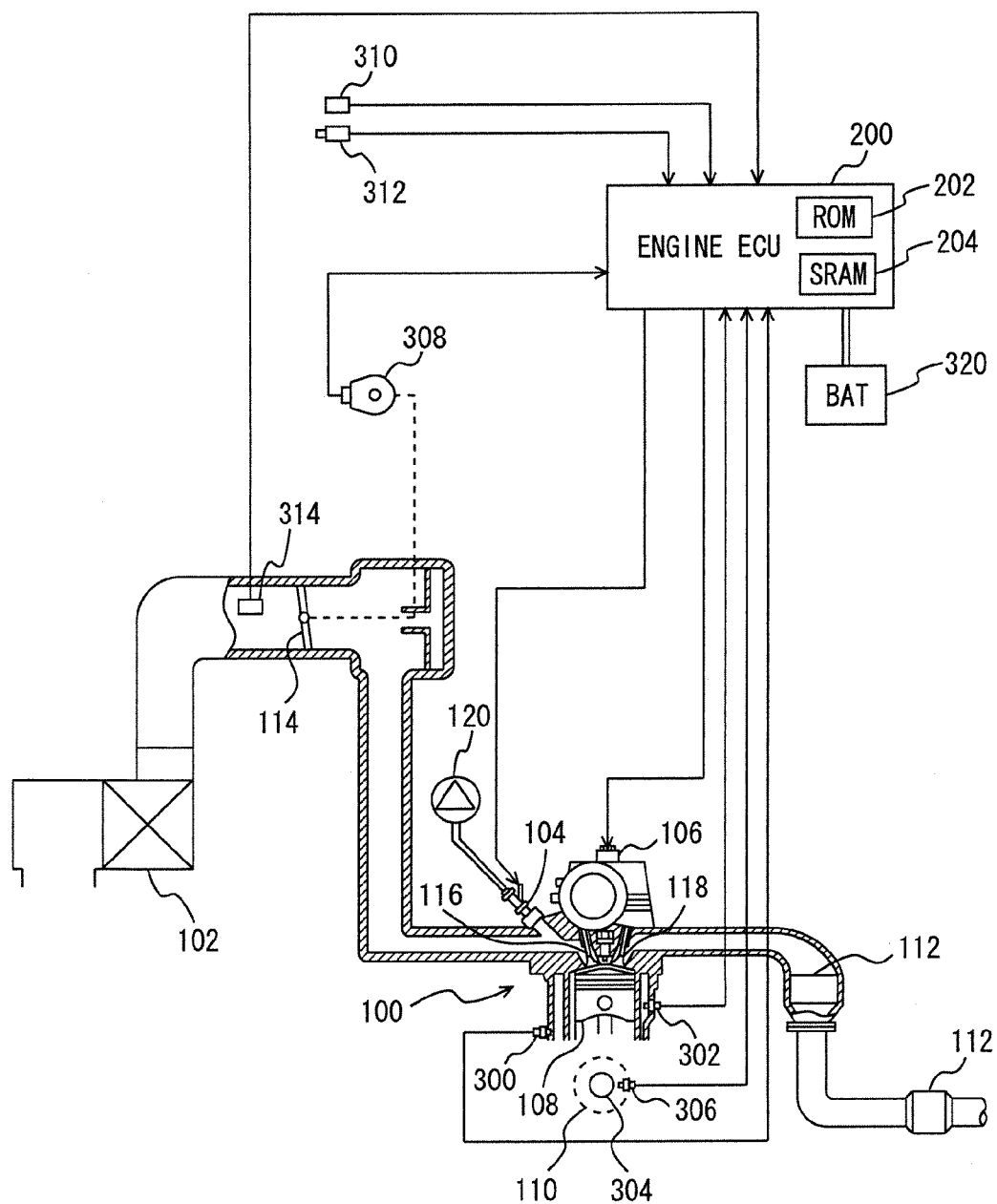
FIG. 1 is a schematic configuration diagram of an engine controlled by an engine ECU which is an ignition timing control device according to an embodiment of the present invention.

An embodiment of the present invention will be described below with reference to the drawings. In the following description, the same parts are provided with the same reference numerals. They have the same names and functions. Therefore, detailed description of the same parts is not repeated.

With reference to FIG. 1, an engine 100 of a vehicle mounted with an ignition timing control device according to the embodiment of the present invention will be described. Engine 100 is provided with a plurality of cylinders. The ignition timing control device according to the present invention is accomplished by a program executed by an engine ECU (Electronic Control Unit) 200, for example.

Engine 100 is an internal combustion engine in which an air-fuel mixture of air drawn in from an air cleaner 102 and fuel injected from an injector 104 is ignited by a spark plug 106 and burnt in a combustion chamber. An ignition timing is controlled to be MBT (Minimum advance for Best Torque) at which output torque becomes the maximum but is retarded or advanced according to an operation state of engine 100 such as occurrence of knocking.

When the air-fuel mixture is burnt, a piston 108 is pushed down by combustion pressure and a crankshaft 110 is rotated. The air-fuel mixture after combustion (exhaust gas) is cleaned by three-way catalysts 112 and exhausted outside a car. An amount of air amount drawn into engine 100 is regulated by a throttle valve 114.

Engine 100 is controlled by engine ECU 200. Connected to engine ECU 200 are a knock sensor 300, a water temperature sensor 302, a crank position sensor 306 provided to face a timing rotor 304, a sensor 308 of an opening position of throttle, a vehicle speed sensor 310, an ignition switch 312, and an air flow meter 314.

Knock sensor 300 is provided to a cylinder block of engine 100. Knock sensor 300 is formed of a piezoelectric element. Knock sensor 300 generates voltage in response to vibration of engine 100. Magnitude of the voltage corresponds to magnitude of the vibration. Knock sensor 300 sends a signal representing voltage to engine ECU 200. Water temperature sensor 302 detects temperature of cooling water in a water jacket of engine 100 and sends a signal representing a detection result to engine ECU 200.

Timing rotor 304 is provided to crankshaft 110 and rotates with crankshaft 110. On an outer periphery of timing rotor 304, a plurality of protrusions are provided at predetermined intervals. Crank position sensor 306 is provided to face the protrusions of the timing rotor 304. When timing rotor 304 rotates, an air gap between the protrusion of timing rotor 304 and crank position sensor 306 changes and, as a result, magnetic flux passing through a coil portion of crank position sensor 306 increases and decreases to generate electromotive force in the coil portion. Crank position sensor 306 sends a signal representing the electromotive force to engine ECU 200. Engine ECU 200 detects a crank angle and the number of rotations of crankshaft 110 based on the signal sent from crank position sensor 306.

Sensor 308 of the opening position of throttle detects an opening position of throttle and sends a signal representing a detection result to engine ECU 200. Vehicle speed sensor 310 detects the number of rotations of a wheel (not shown) and sends a signal representing a detection result to engine ECU 200. Engine ECU 200 calculates a vehicle speed based on the number of rotations of the wheel. Ignition switch 312 is turned on by a driver in starting of engine 100. Air flow meter 314 detects the intake air amount into engine 100 and sends a signal representing a detection result to engine ECU 200.

Engine ECU 200 operates by electric power supplied from an auxiliary battery 320 that is a power supply. Engine ECU 200 performs computation based on signals sent from the respective sensors and ignition switch 312 and map and program stored in ROM (Read Only Memory) 202 or SRAM (Static Random Access Memory) 204 and controls the devices so as to bring engine 100 into a desired operation state.

In the present embodiment, engine ECU 200 detects a waveform of vibration (hereafter referred to as "vibration waveform") of engine 100 in a predetermined knock detection gate (a section between a predetermined first crank angle and a predetermined second crank angle) based on the signal sent from knock sensor 300 and the crank angle and determines whether or not knocking has occurred in engine 100 based on the detected vibration waveform. The knock detection gate in the embodiment is from a top dead center (0°) to 90° in a combustion stroke. The knock detection gate is not limited to it.

Figure 2:
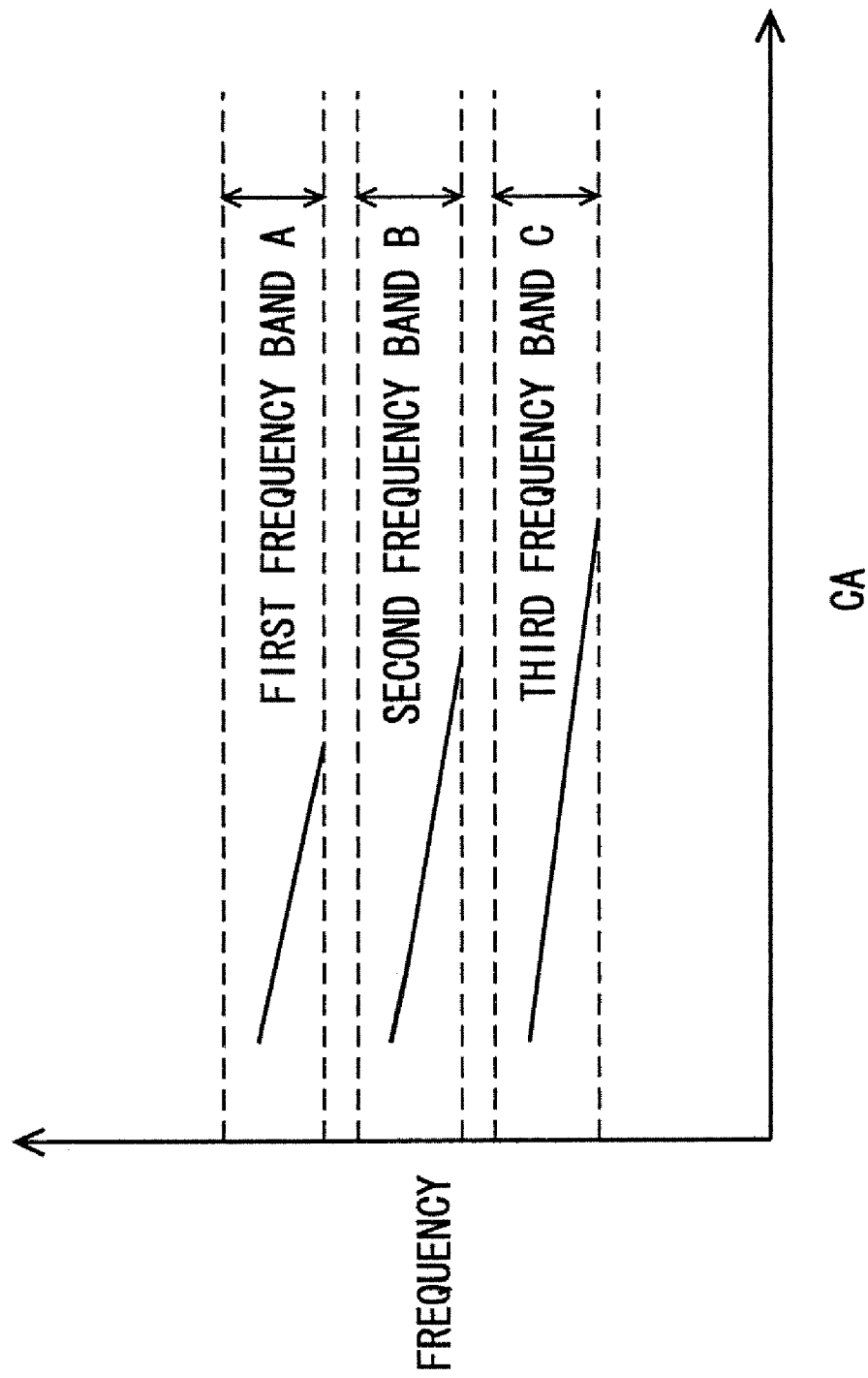
FIG. 2 is a chart showing frequency bands of vibration generated in the engine at the time of knocking.

When knocking occurs, vibration at a frequency near a frequency shown in a solid line in FIG. 2 is generated in engine 100. The frequency of the vibration generated due to the knocking is not constant and varies in a certain range of frequencies. Therefore, in the embodiment, as shown in FIG. 2, vibrations included in a first frequency band A, a second frequency band B, and a third frequency band C, are detected. In FIG. 2, CA designates the crank angle. The number of frequency bands of vibrations generated due to the knocking is not restricted to three.

Figure 3:
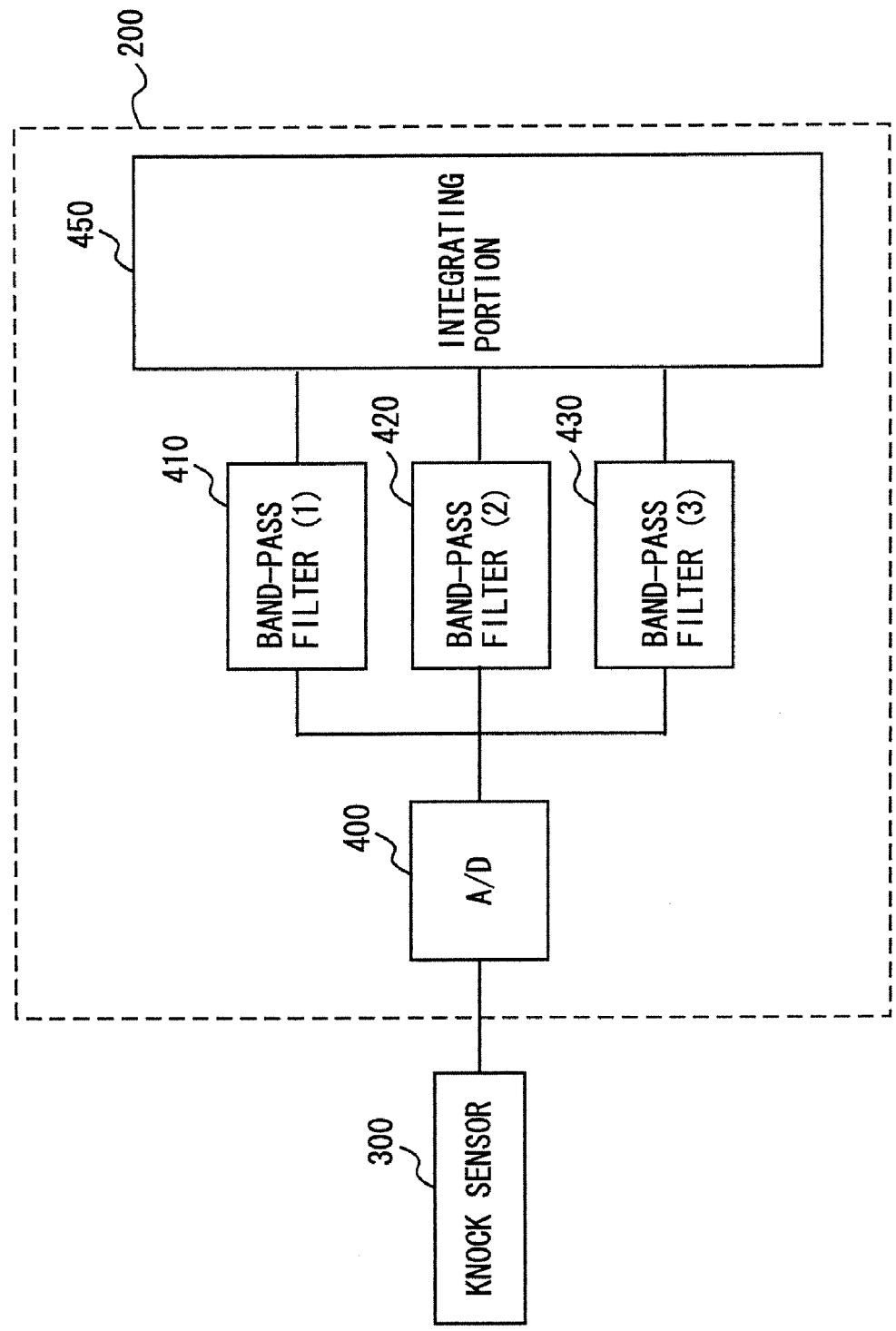
FIG. 3 is a control block diagram showing the engine ECU in FIG. 1.

With reference to FIG. 3, engine ECU 200 will be further described. Engine ECU 200 includes an A/D (analog/digital) converter 400, a band-pass filter (1) 410, a band-pass filter (2) 420, a band-pass filter (3) 430, and an integrating portion 450.

A/D converter 400 converts an analog signal sent from knock sensor 300 into a digital signal. Band-pass filter (1) 410 allows passage of only signals in first frequency band A out of signals sent from knock sensor 300. In other words, by band-pass filter (1) 410, only vibrations in first frequency band A are extracted from vibrations detected by knock sensor 300.

Band-pass filter (2) 420 allows passage of only signals in second frequency band B out of signals sent from knock sensor 300. In other words, by band-pass filter (2) 420, only vibrations in second frequency band B are extracted from vibrations detected by knock sensor 300.

Band-pass filter (3) 430 allows passage of only signals in third frequency band C out of signals sent from knock sensor 300. In other words, by band-pass filter (3) 430, only vibrations in third frequency band C are extracted from vibrations detected by knock sensor 300.

Integrating portion 450 integrates signals selected by the band-pass filters (1) 410 to (3) 430, i.e., magnitudes of vibrations for a crank angle of 5° at a time. The integrated value will hereafter be referred to as an integrated value. The integrated value is calculated in each frequency band. By this calculation of the integrated value, the vibration waveform in each frequency band is detected.

Furthermore, the calculated integrated values in the first to third frequency bands A to C are added to correspond to the crank angles. In other words, the vibration waveforms of the first to third frequency bands A to C are synthesized.

As a result, as shown in FIG. 4, a vibration waveform of engine 100 is detected. In other words, the synthesized waveform of the first to third frequency bands A to C are used as the vibration waveform of engine 100.

Figure 5:
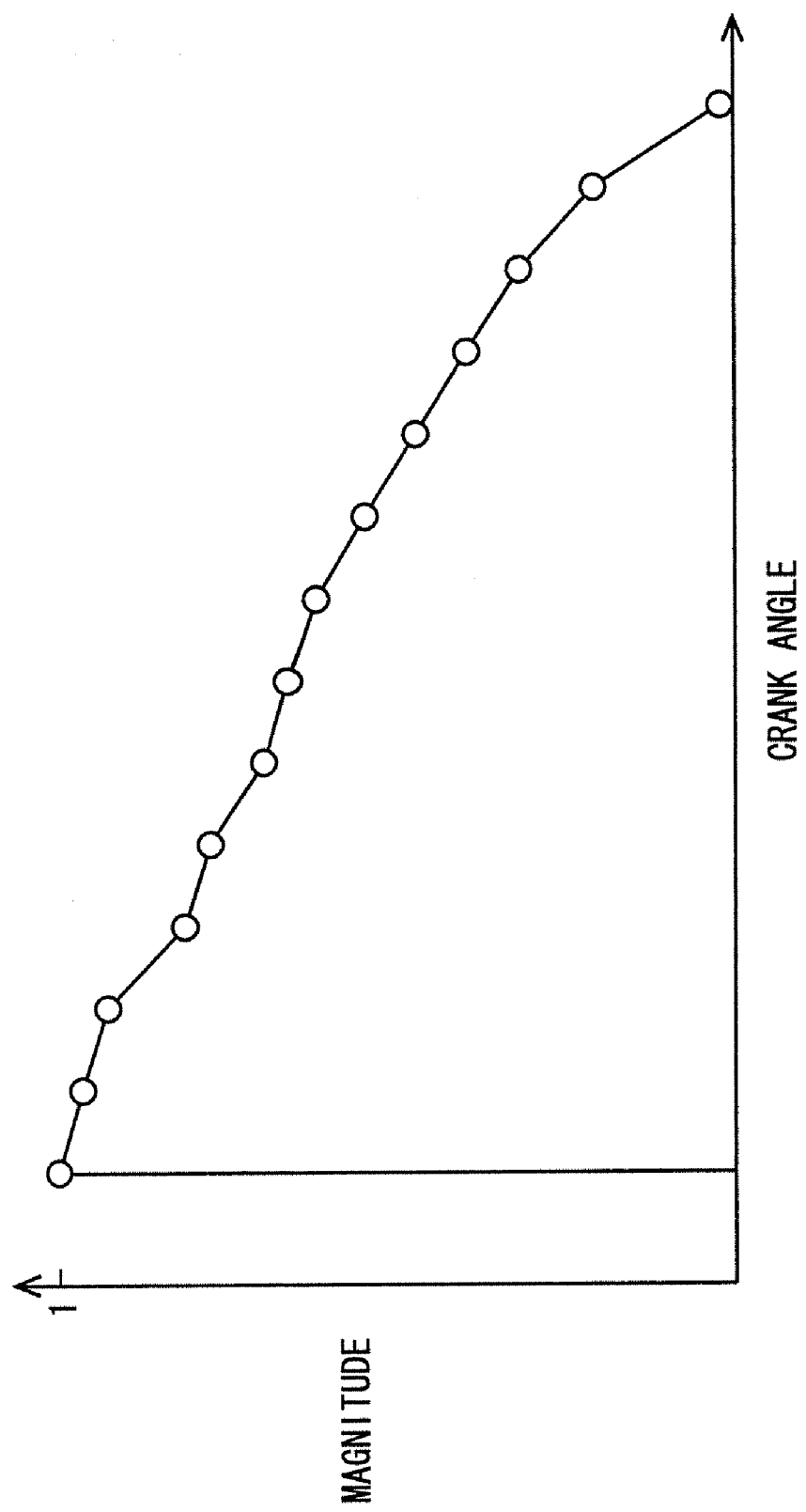
FIG. 5 is a chart showing a knock waveform model stored in memory of the engine ECU.

The detected vibration waveform is compared with a knock waveform model stored in ROM 202 of engine ECU 200 as shown in FIG. 5. The knock waveform model is formed in advance as a model of a vibration waveform when the knocking occurs in engine 100.

In the knock waveform model, the magnitudes of the vibrations are expressed as dimensionless numbers in a range of 0 to 1 and the magnitude of the vibration does not univocally correspond to the crank angle. In other words, in the knock waveform model in the embodiment, it is determined that the magnitude of the vibration decreases as the crank angle increases after a peak value of the magnitude of the vibration, but a crank angle at which the magnitude of the vibration becomes the peak value is not determined.

The knock waveform model in the embodiment corresponds to the vibration after the peak value of the magnitude of the vibration generated due to the knocking. It is also possible to store a knock waveform model corresponding to vibration after a rising edge of the vibration caused by the knocking.

The knock waveform model is formed and stored in advance based on a vibration waveform of engine 100 detected when knocking is forcibly generated experimentally.

The knock waveform model is formed by using engine 100 with dimensions of engine 100 and an output value of knock sensor 300 which are median values of dimensional tolerance and tolerance of the output value of knock sensor 300 (hereafter referred to as "median characteristic engine"). In other words, the knock waveform model is a vibration waveform in a case in which the knocking is forcibly generated in the median characteristic engine. A method of forming the knock waveform model is not limited to it and it is also possible to form the model by simulation.

Figure 6:
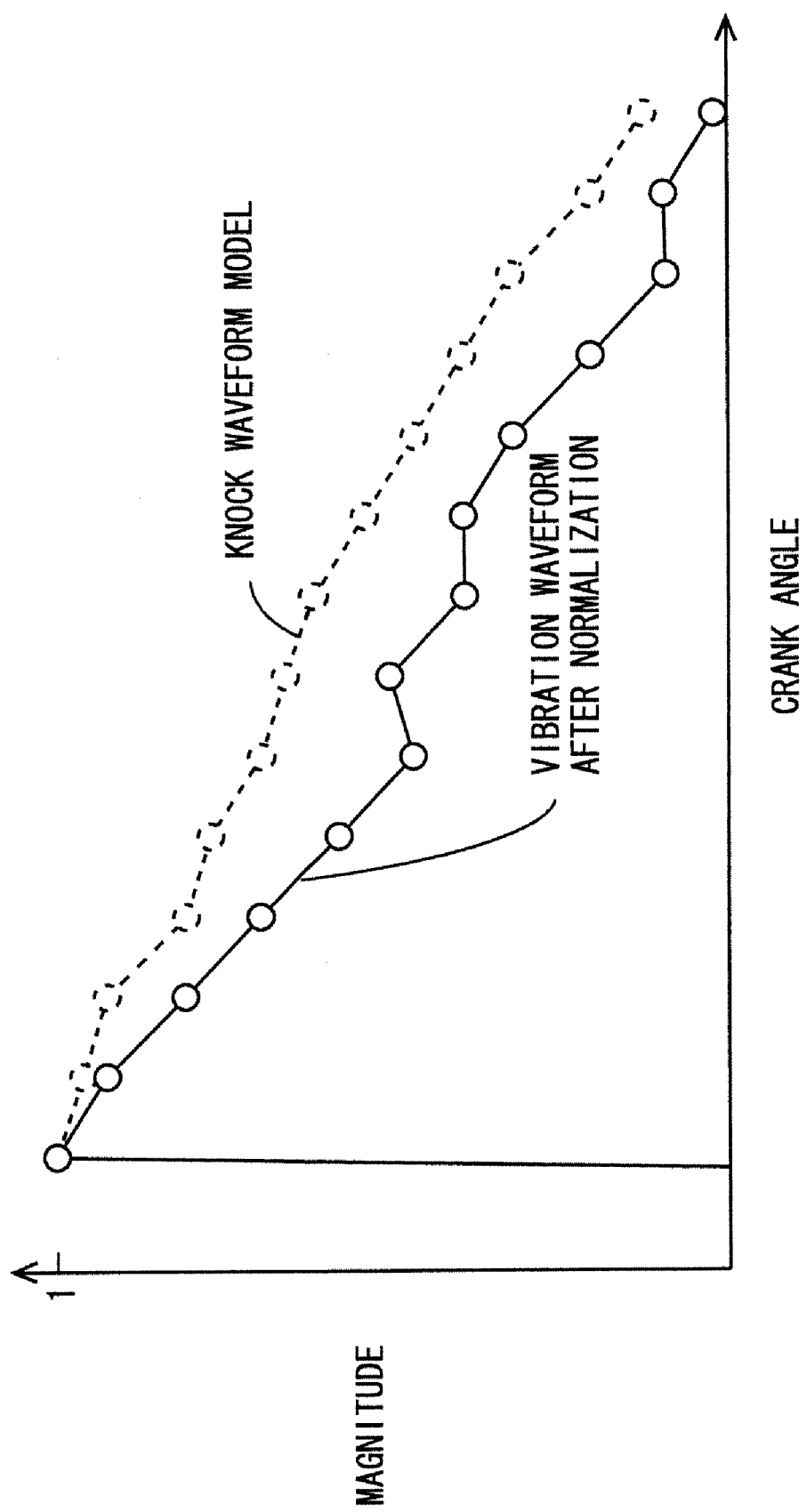
FIG. 6 is a chart for comparing the vibration waveform with the knock waveform model.

In comparison between the detected waveform and the knock waveform model, as shown in FIG. 6, a normalized waveform and the knock waveform model are compared with each other. Here, normalization means to express the magnitude of the vibration as a dimensionless number in a range of 0 to 1 by dividing each integrated value by a maximum value of the integrated value in the detected vibration waveform, for example. However, a method of normalization is not limited to it.

In the embodiment, engine ECU 200 calculates a correlation coefficient K which is a value related to a deviation of the normalized vibration waveform and the knock waveform model from each other. With timing at which the magnitude of the vibration becomes a maximum value in the vibration waveform after the normalization and timing at which the magnitude of the vibration becomes a maximum value in the knock waveform model synchronized, an absolute value (deviation amount) of the deviation of the vibration waveform after the normalization and the knock waveform model from each other is calculated at each crank angle (at every 5° of crank angle) to thereby calculate correlation coefficient K.

If the absolute value of the deviation of the vibration waveform after the normalization and the knock waveform model from each other at each crank angle is $\Delta S(I)$ (I is a natural number) and a value (an area of the knock waveform model) obtained by integrating the magnitude of vibration in the knock waveform model by the crank angle is S, correlation coefficient K is calculated by an equation, $K=(S-\Sigma\Delta S(I))/S$, where $\Sigma\Delta S(I)$ is the total of $\Delta S(I)$. In the embodiment, the closer a shape of the vibration waveform to a shape of the knock waveform model, the greater value correlation coefficient K is calculated as. Therefore, if a waveform of vibration caused by factors other than the knocking is included in the vibration waveform, correlation coefficient K is calculated as a small value. A method of calculating correlation coefficient K is not limited to it.

Furthermore, engine ECU 200 calculates a knock magnitude N based on the maximum value (peak value) of the integrated values. If the maximum integrated value is P and a value representing the magnitude of vibration of engine 100 where knocking does not occur is BGL (Back Ground Level), knock magnitude N is calculated by an equation, $N=P/BGL$. It is noted that maximum integrated value P used in calculating knock magnitude N is logarithmically converted. A method of calculating knock magnitude N is not limited to it.

BGL is calculated as a value obtained by subtracting the product of a standard deviation C and a coefficient U(1) (U(1) is a constant and U(1)=1, for example) from a median value V(50) in the frequency distribution of magnitude values LOG(V), which will be described later. A method of calculating BGL is not limited to it, and BGL may also be stored in ROM 202 in advance.

In the embodiment, engine ECU 200 compares calculated knock magnitude N and a determination value V(KX) stored in SRAM 204 with each other, and further compares the detected waveform and the stored knock waveform model with each other. Then engine ECU 200 determines whether or not knocking has occurred in engine 100 for every ignition cycle.

As shown in FIG. 7, determination values V(KX) are stored as a map for each range divided by an operation state using an engine speed NE and an intake air amount KL as parameters. In the embodiment, nine ranges for each cylinder are provided, which are divided as follows: low speed (NE<NE(1)); medium speed (NE(1)≦NE<NE(2)); high speed (NE(2)≦NE); low load (KL<KL(1)); medium load (KL(1)≦KL<KL(2)); and high load (KL(2)≦KL). The number of the ranges is not limited to it. The ranges may be divided using parameters other than engine speed NE and intake air amount KL.

At the time of shipment of engine 100 or the vehicle, a value determined in advance by an experiment or the like is used as determination value V(KX) stored in ROM 202 (an initial value of determination value V(KX) at the time of shipment). However, a magnitude of the same vibration occurring in engine 100 may be detected as different values due to variation in the output values and degradation of knock sensor 300. In this case, it is necessary to correct determination value V(KX) and to determine whether or not knocking has occurred by using determination value V(KX) corresponding to the magnitude detected actually.

Therefore, in the embodiment, a knock determination level V(KD) is calculated based on frequency distribution representing a relationship between a magnitude value LOG (V) which is a value obtained by logarithmically converting magnitudes V and a frequency (the number of times, a probability) of detection of each magnitude value LOG(V).

Magnitude value LOG(V) is calculated for each range in which engine speed NE and intake air amount KL are used as parameters. Magnitude V used for calculating magnitude value LOG(V) is a peak value (peak value of integrated values at every 5°) of magnitudes between predetermined crank angles. Based on calculated magnitude value LOG(V), median value V(50) at which the accumulative sum of frequencies of magnitudes LOG(V) from the minimum value reaches 50% is calculated. Furthermore, a standard deviation σ of magnitude values LOG(V) equal to or smaller than median value V(50) is calculated. For example, in the embodiment, a median value V(50) and a standard deviation σ, which approximate the median value and standard deviation calculated based on a plurality of magnitude values LOG(V) (e.g., 200 cycles), are calculated for each ignition cycle by the following calculation method.

If a currently detected magnitude value LOG(V) is greater than a previously calculated median value V(50), then a value obtained by adding a predetermined value C(1) to the previously calculated median value V(50) is calculated as a current median value V(50). On the other hand, if a currently detected magnitude value LOG(V) is smaller than a previously calculated median value V(50), then a value obtained by subtracting a predetermined value C(2) (e.g., C(2) and C(1) are the same value) from the previously calculated median value V(50) is calculated as a current median value V(50).

If a currently detected magnitude value LOG(V) is smaller than a previously calculated median value V(50) and greater than a value obtained by subtracting a previously calculated standard deviation σ from the previously calculated median value V(50), then a value obtained by subtracting a value twice as large as a predetermined value C(3) from the previously calculated standard deviation σ is calculated as a current standard deviation σ. On the other hand, if a currently detected magnitude value LOG(V) is greater than a previously calculated median value V(50) or smaller than a value obtained by subtracting a previously calculated standard deviation σ from the previously calculated median value V(50), then a value obtained by adding a predetermined value C(4) (e.g., C(3) and C(4) are the same value) to the previously calculated standard deviation σ is calculated as a current standard deviation σ. A method of calculating median value V(50) and standard deviation σ is not limited to it. Also, initial values of median value V(50) and standard deviation σ may be values set in advance or may be "0".

Figure 8:
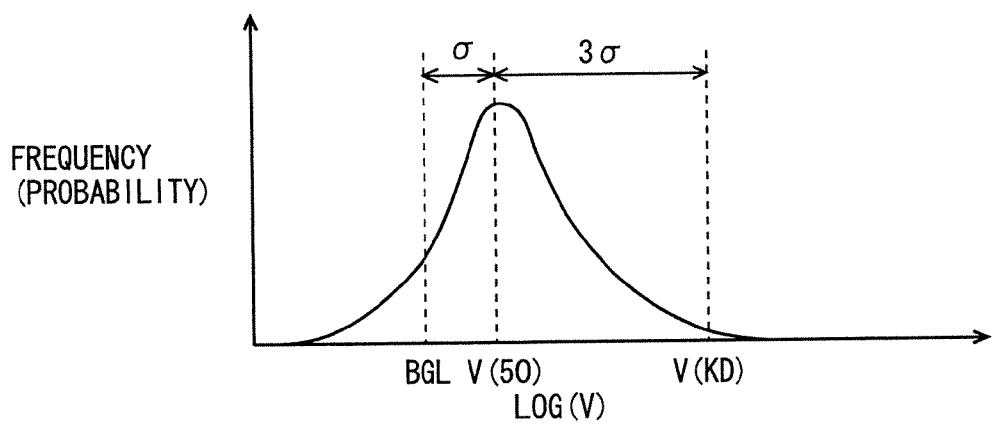
FIG. 8 is a chart (No. 1) showing frequency distribution of magnitude values LOG(V)

As shown in FIG. 8, a value obtained by subtracting the product of a standard deviation σ and coefficient U(1) from a median value V(50) is calculated as BGL. Furthermore, a value obtained by adding to this BGL the product of standard deviation σ and coefficient U(2) (U(2) is a constant and U(2)=4, for example) is calculated as knock determination level V(KD).

That is, a value obtained by adding the product of a coefficient U(3) (U(3) is a constant and U(3)=3, for example) and standard deviation σ to median value V(50) is knock determination level V(KD). A method of calculating knock determination level V(KD) is not limited to it.

It is determined that the frequency of magnitude values LOG(V) greater than knock determination level V(KD) is a frequency of occurrence of knocking. Based on the frequency of occurrence of knocking, determination value V(KX) is corrected. The frequency distribution of magnitude values LOG(V) is formed for each range described above, and determination value V(KX) of each range is corrected.

Coefficients U(1)-U(3) are coefficients obtained based on data and findings obtained by experiments and the like. It is also possible to use other values than "1", "3", and "4" as coefficients U(1)-U(3).

Figure 9:
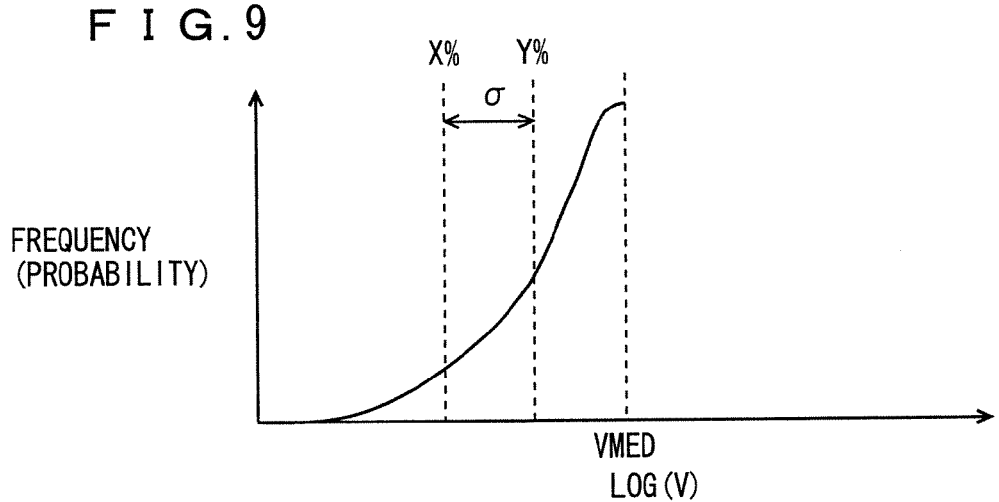
FIG. 9 is a chart (No. 2) showing frequency distribution of magnitude values LOG(V)

Referring to FIG. 9, standard deviation σ is further described. Standard deviation σ is calculated using magnitude values LOG(V) equal to or smaller than a median value VMED. As shown in FIG. 9, standard deviation σ is calculated as a difference between a value A at which the accumulative sum of frequencies of magnitudes LOG(V) from the minimum value reaches X % and a value B at which the accumulative sum of frequencies of magnitudes LOG(V) from the minimum value reaches Y % (B>A).

Figure 10:
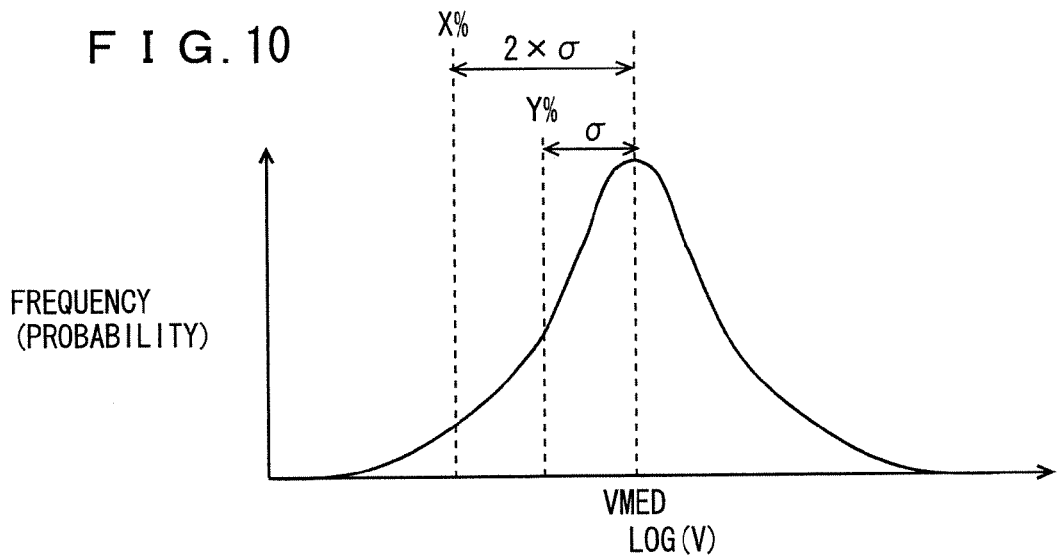
FIG. 10 is a chart (No. 3) showing frequency distribution of magnitude values LOG(V)

Here, as shown in FIG. 10, X % is a proportion of magnitude values LOG(V) taking on the values ranging from the minimum value to VMED−2×σ when the frequency distribution of magnitude values LOG(V) becomes normal distribution (when knocking does not occur).

Similarly, as shown in FIG. 10, Y % is a proportion of magnitude values LOG(V) taking on the values ranging from the minimum value to VMED−σ when the frequency distribution of magnitude values LOG(V) becomes normal distribution (when knocking does not occur). These proportions are theoretical figures determined based on experiments, simulations and the like in advance. BGL and knock determination level V(KD) are calculated using such standard deviation σ.

Figure 11:
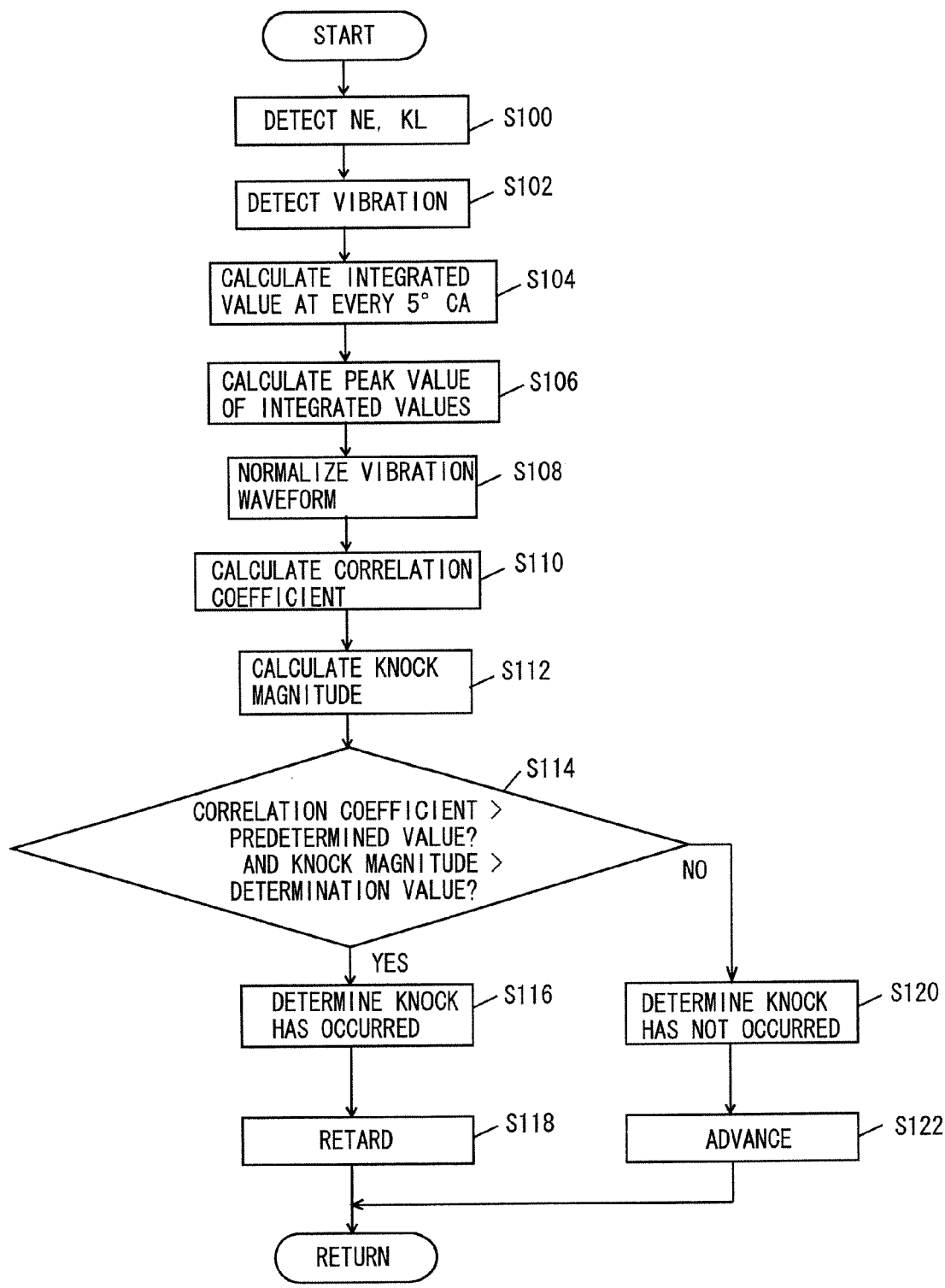
FIG. 11 is a flowchart (No. 1) showing a control structure of the program executed by the engine ECU in FIG. 1.

With reference to FIG. 11, a control structure of a program executed by engine ECU 200 which is the ignition timing control device according to the embodiment so as to control the ignition timing by determining whether or not knocking has occurred in each ignition cycle will be described.

In step 100 (hereafter "step" will be abbreviated to "S"), engine ECU 200 detects engine speed NE based on a signal sent from crank position sensor 306 and detects intake air amount KL based on a signal sent from air flow meter 314.

In S102, engine ECU 200 detects magnitude of vibration of engine 100 based on a signal sent from knock sensor 300. The magnitude of the vibration is expressed as an output voltage of knock sensor 300. The magnitude of the vibration may be expressed as a value corresponding to the output voltage of knock sensor 300. Detection of the magnitude is carried out between the top dead center and 90° (a crank angle of 90°) in a combustion stroke.

In S104, engine ECU 200 calculates a value (integrated value) obtained by integrating output voltages (values representing magnitudes of vibrations) of knock sensor 300 for every 5° (for 5°) of crank angle. The integrated value is calculated for vibrations in each of first to third frequency bands A to C. Moreover, integrated values in the first to third frequency bands A to C are added to correspond to the crank angles to thereby detect a vibration waveform of engine 100.

In S106, engine ECU 200 calculates the largest integrated value (peak value P) out of integrated values in a synthesized waveform (vibration waveform of engine 100) of the first to third frequency bands A to C.

In S108, engine ECU 200 normalizes the vibration waveform of engine 100. Here, normalization means to express the magnitude of the vibration as a dimensionless number in a range of 0 to 1 by dividing each integrated value by the calculated peak value.

In S110, engine ECU 200 calculates correlation coefficient K which is a value related to the deviation of the normalized vibration waveform and the knock waveform model from each other. In S112, engine ECU 200 calculates a knock magnitude N.

In S114, engine ECU 200 determines whether correlation coefficient K is greater than a predetermined value and knock magnitude N is greater than determination value V(KX). If correlation coefficient K is greater than a predetermined value and knock magnitude N is greater than determination value V(KX) (YES in S114), the processing moves to S116. Otherwise (NO in S114), the processing moves to S120.

In S116, engine ECU 200 determines that knocking has occurred in engine 100. In S118, engine ECU 200 retards the ignition timing. In S120, engine ECU 200 determines that knocking has not occurred in engine 100. In S122, engine ECU 200 advances the ignition timing.

Figure 12:
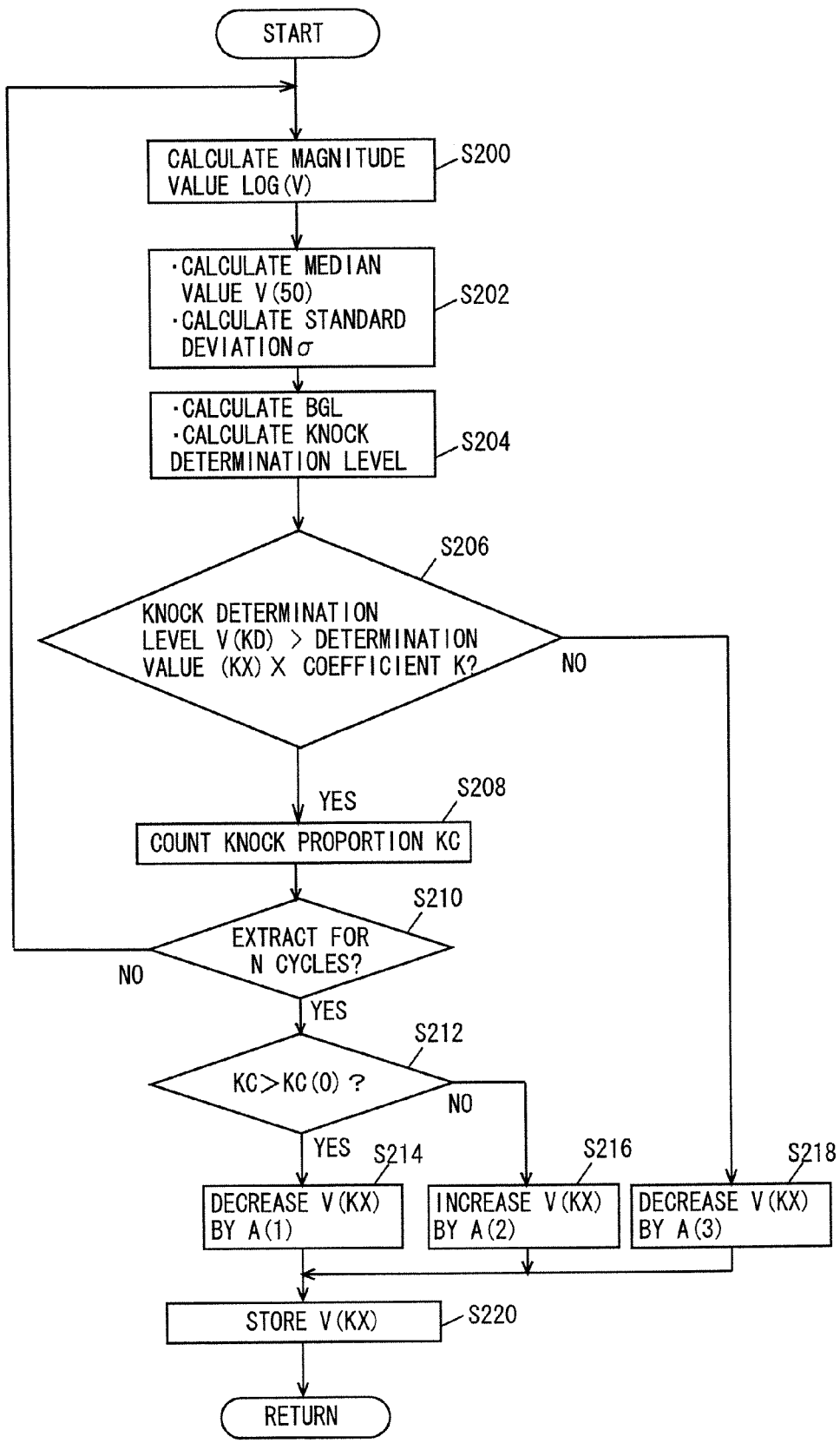
FIG. 12 is a flowchart (No. 2) showing the control structure of the program executed by the engine ECU in FIG. 1.

With reference to FIG. 12, a control structure of a program executed by engine ECU 200 which is the ignition timing control device according to the embodiment so as to set determination value V(KX) will be described.

In S200, engine ECU 200 calculates magnitude value LOG(V) from magnitude V detected based on a signal transmitted from knock sensor 300. Magnitude V is a peak value (peak value of integrated values at every 5°) between predetermined crank angles.

In S202, engine ECU 200 calculates median value V(50) and standard deviation σ of the calculated magnitude values LOG(V). It is noted that median value V(50) and standard deviation σ may be calculated every time magnitude values LOG(V) for N cycle(s) (N is a natural number and N=200, for example) are extracted.

In S204, engine ECU 200 calculates BGL and knock determination level V(KD) based on calculated median value V(50) and standard deviation σ.

In S206, engine ECU 200 determines whether or not knock determination level (KD) is greater than the product of current determination value V(KX) and a coefficient K (e.g., K=1.5). When knock determination level V(KD) is greater than the product of current determination value V(KX) and coefficient K (YES in S206), the processing moves to S218. Otherwise (NO in S206), the processing moves to S208.

In S208, engine ECU 200 counts the proportion of magnitude values LOG(V) greater than knock determination level V(KD) to the extracted magnitude values LOG(V) as a knock proportion KC.

In S210, engine ECU 200 determines whether or not magnitude values LOG (V) for N cycle(s) since previous determination value V(KX) was corrected are extracted. When magnitude values LOG (V) for N cycle(s) are extracted (YES in S210), the processing moves to S212. Otherwise (NO in S210), the processing goes back to S200.

In S212, engine ECU 200 determines whether or not knock proportion KC is greater than a threshold value KC(0). If knock proportion KC is greater than threshold value KC(0) (YES in S212), the processing moves to S214. Otherwise (NO in S212), the processing moves to S216.

In S214, engine ECU 200 decreases determination value V(KX) by a predetermined correction amount A(1). In S216, engine ECU 200 increases determination value V(KX) by a predetermined correction amount A(2).

In S218, engine ECU 200 decreases determination value V(KX) by a predetermined correction amount A(3) (A(3)>A(1)).

In S220, engine ECU 200 stores determination value V(KX) in SRAM 204. Thereafter, the processing ends.

Operation of engine ECU 200 which is the ignition timing control device according to the embodiment based on the above configuration and flowcharts will be described.

During an operation of engine 100, engine speed NE is detected based on the signal sent from crank position sensor 306 and intake air amount KL is detected based on the signal sent from air flow meter 314 (S100). Moreover, based on the signal sent from knock sensor 300, a magnitude of vibration of engine 100 is detected (S102).

Between the top dead center and 90° in the combustion stroke, the integrated value for every 5° of vibrations in each of the first to third frequency bands A to C is calculated (S104). The calculated integrated values in the first to third frequency bands A to C are added to correspond to the crank angles to thereby detect the above-described vibration waveform of engine 100 as shown in FIG. 4.

As an integrated value for every five degrees is used to detect a vibration waveform, it becomes possible to detect a vibration waveform of which delicate variations are suppressed. Therefore, it becomes easy to compare the detected vibration waveform and the knock waveform model with each other.

Based on the calculated integrated values, peak value P of the integrated values in the synthesized waveform (vibration waveform of engine 100) of the first to third frequency bands A to C is calculated (S106).

The integrated value in the vibration waveform of engine 100 is divided by the calculated peak value P to thereby normalize the vibration waveform (S108). By normalization, the magnitudes of the vibrations in the vibration waveform are expressed as dimensionless numbers in a range of 0 to 1. In this manner, it is possible to compare the detected vibration waveform and the knock waveform model with each other irrespective of the magnitude of the vibration. Therefore, it is unnecessary to store the large number of knock waveform models corresponding to the magnitudes of the vibrations to thereby facilitate forming of the knock waveform model.

With timing at which the magnitude of the vibration becomes a maximum value in the vibration waveform after the normalization and timing at which the magnitude of the vibration becomes a maximum value in the knock waveform model synchronized (see FIG. 6), an absolute value ΔS(I) of the deviation of the vibration waveform after the normalization and the knock waveform model from each other at each crank angle is calculated. Based on the total of ΔS(I), i.e., ΣΔS(I) and value S obtained by integrating the magnitude of the vibration in the knock waveform model by the crank angle, correlation coefficient K is calculated by K=(S−ΣΔS(I))/S (S110). In this manner, it is possible to convert a degree of agreement between the detected vibration waveform and the knock waveform model into a number to objectively determine the degree. Furthermore, by comparing the vibration waveform and the knock waveform model with each other, it is possible to analyze whether or not the vibration is a vibration at the time of knocking from behavior of the vibration such as an attenuating trend of the vibration.

Furthermore, knock magnitude N is calculated by dividing peak value P (a value obtained by logarithmically converting peak value P) by BGL (S112). Thus, it becomes possible to analyze in more detail whether or not vibration of engine 100 is due to knocking based on the magnitude of vibration.

If correlation coefficient K is greater than a predetermined value and knock magnitude N is greater than a predetermined determination value V(KX) (YES in S114), it is determined that knocking has occurred (S116) and the ignition timing is retarded (S118). As a result, occurrence of the knocking is suppressed. If correlation coefficient K is not greater than a predetermined value or knock magnitude N is not greater than a predetermined determination value (NO in S114), it is determined that knocking has not occurred (S120) and the ignition timing is advanced (S122). Thus, by comparing knock magnitude N and determination value V(KX) with each other, whether or not knocking has occurred is determined for each ignition cycle, and the ignition timing is retarded or advanced.

Meanwhile, a magnitude of the same vibration occurring in engine 100 may be detected as different values due to variation in the output values and degradation of knock sensor 300. In such a case, it is necessary to correct determination value V(KX) and to determine whether or not knocking has occurred by using determination value V(KX) corresponding to the magnitude detected actually.

Therefore, in engine ECU 200 that is the ignition timing control device according to the embodiment, magnitude value LOG(V) is calculated (S200). Median value V(50) and standard deviation σ of the calculated magnitude values LOG(V) is calculated (S202). Based on calculated median value V(50) and standard deviation σ, BGL and knock determination level V(KD) are calculated (S204).

Figure 13:
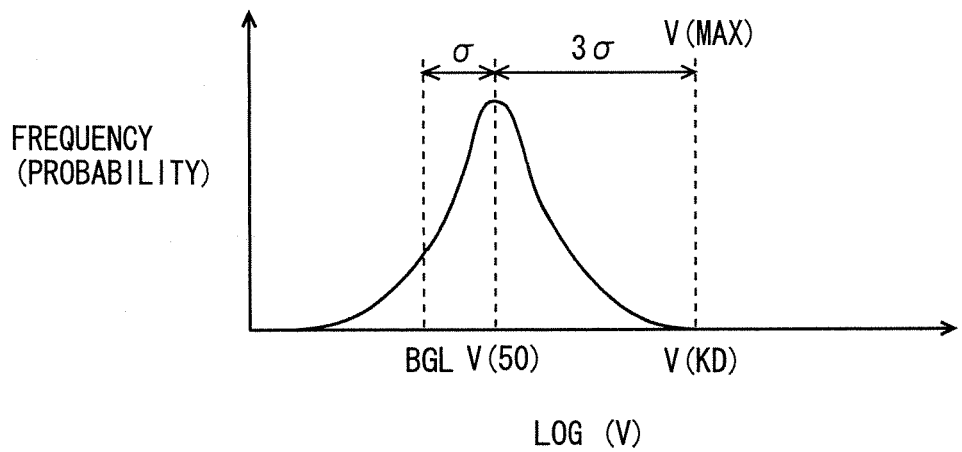
FIG. 13 is a chart (No. 4) showing frequency distribution of magnitude values LOG(V)

As shown in FIG. 13, the frequency distribution of magnitude values LOG(V) becomes normal distribution when knocking does not occur in engine 100. Here, maximum value V(MAX) of magnitude value LOG(V) and knock determination level V(KD) agree with each other.

Figure 14:
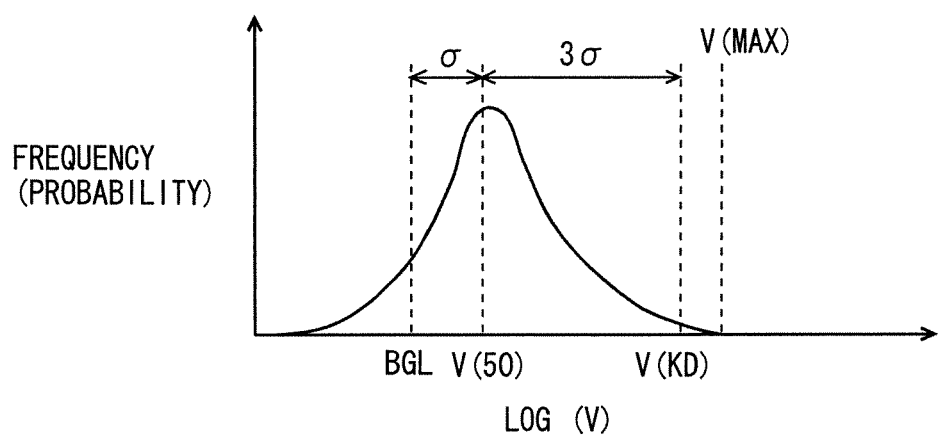
FIG. 14 is a chart (No. 5) showing frequency distribution of magnitude values LOG(V)

On the other hand, when a greater magnitude V is detected and a greater magnitude value LOG(V) is calculated by the occurrence of knocking, as shown in FIG. 14, maximum value V(MAX) becomes greater than knock determination level V(KD).

Figure 15:
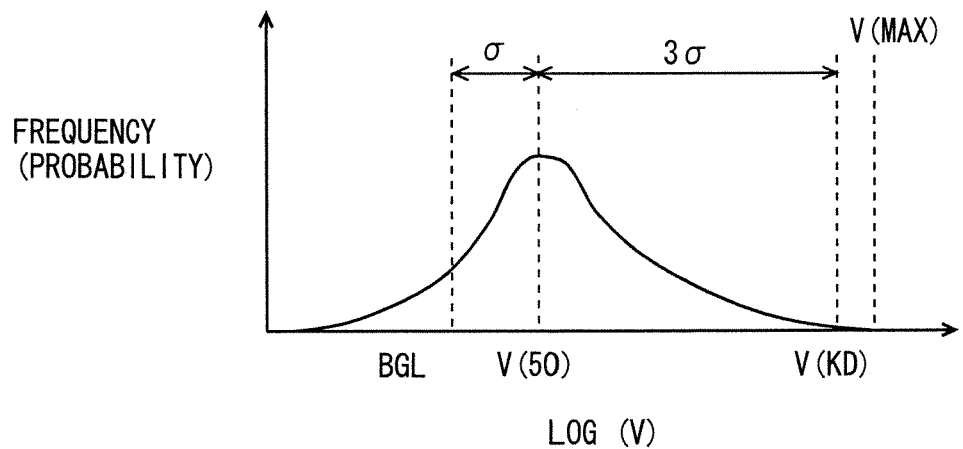
FIG. 15 is a chart (No. 6) showing frequency distribution of magnitude values LOG(V)

When the frequency of occurrence of knocking becomes further higher, as shown in FIG. 15, maximum value V(MAX) becomes further greater. Median value V(50) and standard deviation σ in the frequency distribution become greater as maximum value V(MAX) does. As a result, knock determination level V(KD) becomes greater.

A magnitude value LOG(V) smaller than knock determination level V(KD) is not determined as a magnitude value LOG(V) in a cycle in which knocking has occurred. Therefore, as knock determination level V(KD) becomes greater, the frequency of determining that knocking has not occurred while knocking has actually occurred becomes greater. Accordingly, the precision of correcting determination value V(KX) may be deteriorated.

Therefore, in the embodiment, by determining whether or not knock determination level V(KD) is greater than the product of current determination value V(KX) and coefficient K, whether or not it is a state where knocking frequently occurs is determined.

As shown in FIG. 16, when knock determination level V(KD) is smaller than the product of current determination value V(KX) and coefficient K (NO in S206), it can be regarded that it is a state where magnitude of vibration is relatively small, that is, a state where knocking does not frequently occur.

Here, as normal control, the proportion of magnitude values LOG(V) greater than knock determination level V(KD) is counted as a knock proportion KC (S208). When magnitude values LOG (V) for N cycle(s) since previous determination value V(KX) was corrected are extracted (YES in S210) and knock proportion KC is greater than threshold value KC(O) (YES in S212), determination value V(KX) is decreased by a predetermined correction amount A(1) so that the frequency of retard control of ignition timing (S118) being performed becomes higher and that the degree of retard becomes greater (S214).

When knock proportion KC is smaller than threshold value KC(O) (NO in S212), engine ECU 200 increases determination value V(KX) by a predetermined correction amount A(2) so that the frequency of advance control of ignition timing (S122) being performed becomes higher. Thus, determination value V(KX) in knocking determination for every ignition cycle can appropriately be corrected to appropriately correct ignition timing.

On the other hand, as shown in FIG. 17, when knock determination level V(KD) is greater than the product of current determination value V(KX) and coefficient K (YES in S206), it can be regarded that it is a state where magnitude of vibration is relatively great, that is, a state where knocking frequently occurs. In this case, it is necessary to quickly decrease determination value V(KX) so that the frequency of retard control of ignition timing (S118) being performed becomes higher and the degree of retard becomes greater.

Accordingly, determination value V(KX) is decreased by correction amount A(3) that is greater than correction amount A(1) (S218). Thus, when knocking frequently occurs, the retard control of ignition timing can frequently be performed to thereby suppress knocking.

As above, according to the engine ECU which is the ignition timing control device of the present embodiment, when knock determination level V(KD), which is calculated as a value obtained by adding the product of standard deviation σ of magnitude values LOG(V) and coefficient U(3) to median value V(50), is greater than the product of determination value V(KX) and coefficient K, determination value V(KX) is decreased. Thus, when it can be regarded that it is a state where knocking has frequently occurred, a determination that knocking has occurred can easily be made in a knocking determination for each ignition cycle. Therefore, ignition timing can be retarded more frequently. As a result, knocking can be suppressed.

It is noted that, while in the embodiment determination value V(KX) is decreased when knock determination level V(KD) is greater than the product of determination value V(KX) and coefficient K, determination value V(KX) may be decreased when knock determination level V(KD) is greater than the sum of determination value V(KX) and a predetermined value. In this case, the product of standard deviation σ and a coefficient may be employed as the predetermined value.

Furthermore, in place of knock determination level V(KD), a value that is different from knock determination level V(KD) and that can be obtained by adding to median value V(50) the product of standard deviation σ and a coefficient may be employed.

Figure 18:
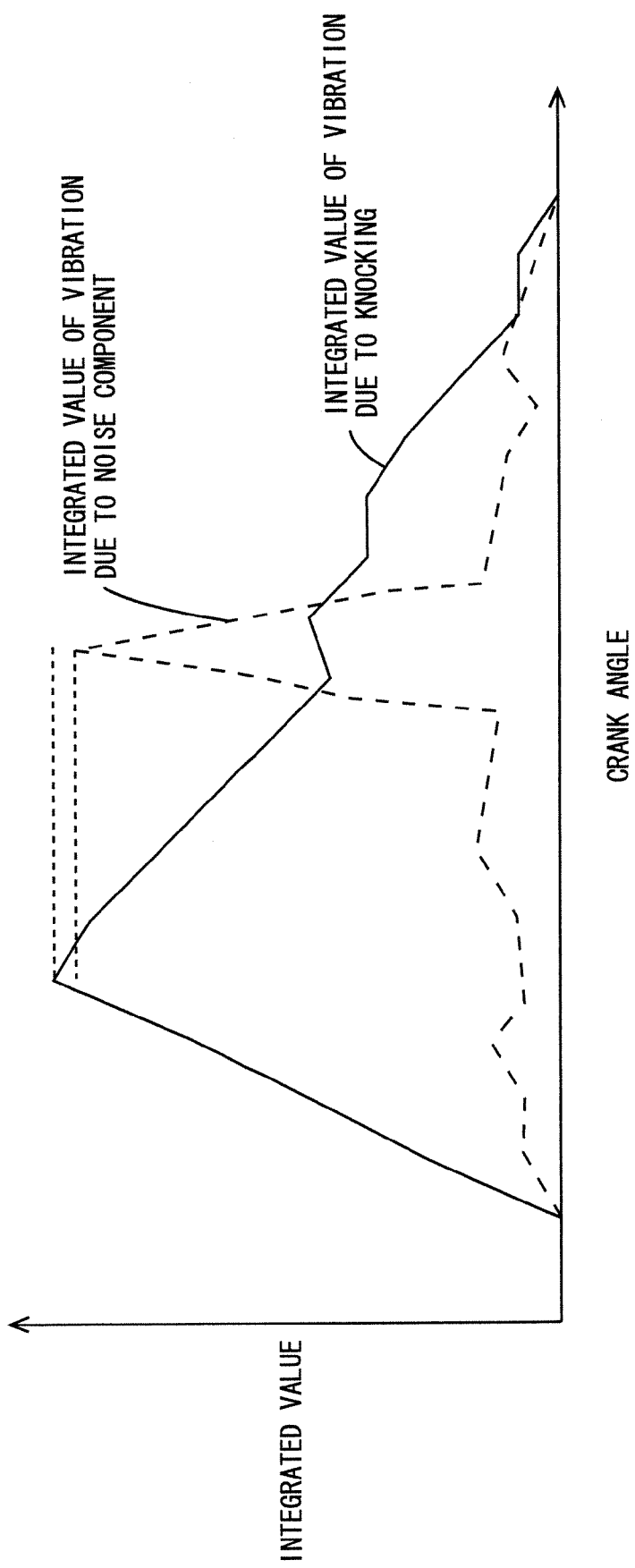
FIG. 18 is a chart (No. 1) showing an integrated value at the time of knocking and an integrated value by noise.

As shown in FIG. 18, when magnitude of vibration due to noise is large, the difference between the maximum value of the integrated values at the time of knocking and the maximum value of the integrated values due to noise is small and it may be difficult to distinguish between knocking and noise from knocking magnitude N. Therefore, as shown in FIG. 18, it is also possible to calculate knock magnitude N by using the sum of the integrated values in the vibration waveform (a value obtained by integrating all output voltages of knock sensor 300 in the knock detection gate) instead of the peak value P of the integrated values. In other words, it is also possible to calculate knock magnitude N by dividing the sum of the integrated values in the vibration waveform by BGL.

Figure 19:
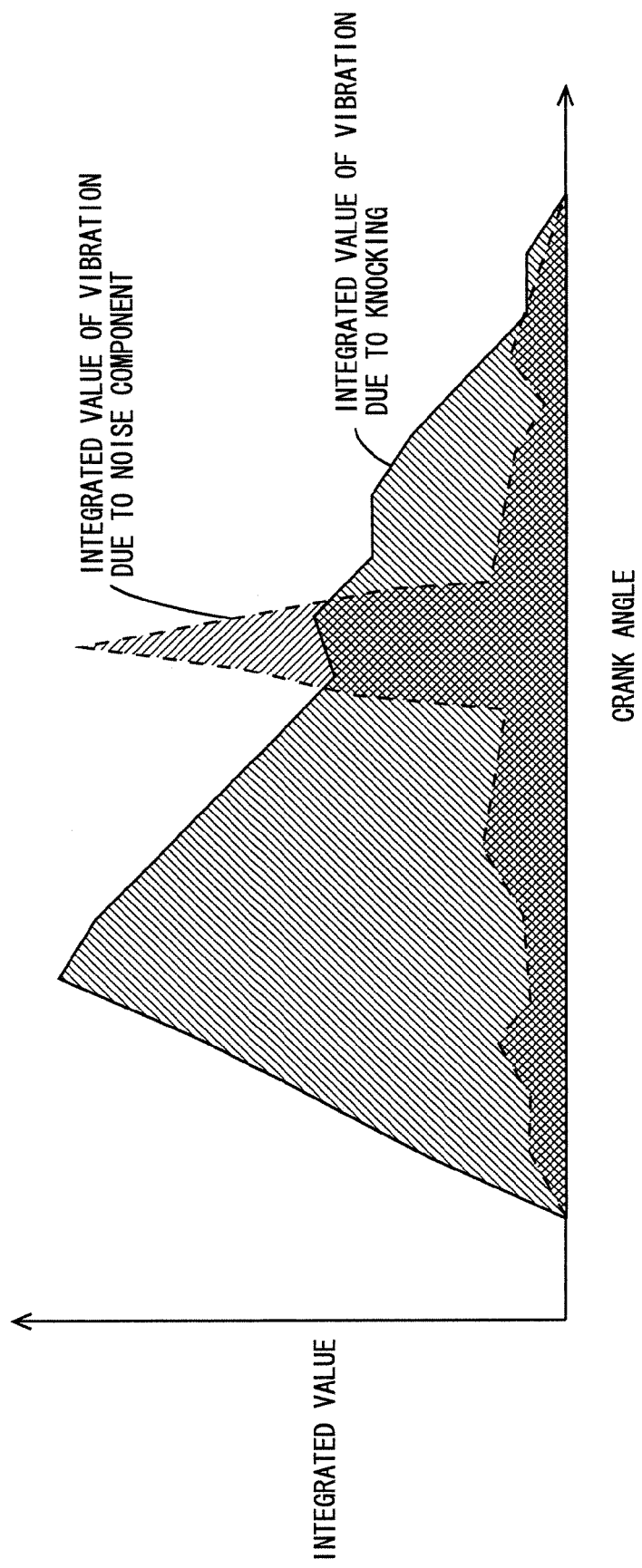
FIG. 19 is a chart (No. 2) showing an integrated value at the time of knocking and an integrated value by noise.

As shown in FIG. 19, because a period in which vibrations due to noise occur is shorter than a period in which vibrations due to knocking occur, a difference between the sum of integrated values of knocking and that of noise may be large. Therefore, by calculating knock magnitude N based on the sum of the integrated values, it is possible to obtain a large difference between knock magnitude N calculated at the time of knocking and knock magnitude N calculated as a result of noise. Thus, it is possible to clearly distinguish between vibration due to knocking and vibration due to noise.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A device for controlling ignition timing of an internal combustion engine, comprising:
   a knock sensor detecting for a plurality of times a magnitude of vibration occurring in said internal combustion engine; and
   an operation unit connected to said knock sensor, wherein
   said operation unit calculates a knock magnitude related to a magnitude of vibration due to knocking, in accordance with each said magnitude detected by said knock sensor,
   said operation unit controls ignition timing of said internal combustion engine, based on a result of comparison between said knock magnitude and a predetermined first determination value,
   said operation unit calculates a median value and a standard deviation of said magnitudes detected by said knock sensor, and
   said operation unit corrects said first determination value so that degree of ignition timing being retarded becomes greater when a second determination value calculated by adding a product of said standard deviation and a predetermined coefficient to said median value is greater than said first determination value.

2. The device for controlling ignition timing of the internal combustion engine according to claim 1, wherein
   said operation unit further calculates a third determination value greater than said first determination value, based on said first determination value,
   when said second determination value is greater than said first determination value since said second determination value is greater than said third determination value, said operation unit corrects said first determination value so that the degree of the ignition timing being retarded becomes greater.

3. The device for controlling ignition timing of the internal combustion engine according to claim 2, wherein
   said operation unit calculates said third determination value by multiplying said first determination value by a predetermined value.

4. The device for controlling ignition timing of the internal combustion engine according to claim 2, wherein
   said operation unit calculates said third determination value by adding a predetermined value to said first determination value.

5. The device for controlling ignition timing of the internal combustion engine according to claim 1, wherein
   said operation unit controls the ignition timing to be retarded when said knock magnitude is greater than said first determination value, and
   said operation unit corrects said first determination value so that said first determination value becomes smaller.

6. A method of controlling ignition timing of an internal combustion engine, comprising the steps of:
   detecting for a plurality of times a magnitude of vibration occurring in said internal combustion engine;
   calculating a knock magnitude related to a magnitude of vibration due to knocking, in accordance with each said magnitude being detected;
   controlling ignition timing of said internal combustion engine, based on a result of comparison between said knock magnitude and a predetermined first determination value;
   calculating a median value and a standard deviation of said magnitudes being detected; and
   correcting said first determination value so that degree of ignition timing being retarded becomes greater when a second determination value calculated by adding a product of said standard deviation and a predetermined coefficient to said median value is greater than said first determination value.

7. The method of controlling ignition timing of the internal combustion engine according to claim 6, further comprising a step of
   calculating a third determination value greater than said first determination value, based on said first determination value, wherein
   said step of correcting said first determination value includes a step of, when said second determination value is greater than said first determination value since said second determination value is greater than said third determination value, correcting said first determination value so that the degree of the ignition timing being retarded becomes greater.

8. The method of controlling ignition timing of the internal combustion engine according to claim 7, wherein
   said step of calculating said third determination value includes a step of calculating said third determination value by multiplying said first determination value by a predetermined value.

9. The method of controlling ignition timing of the internal combustion engine according to claim 7, wherein
   said step of calculating said third determination value includes a step of calculating said third determination value by adding a predetermined value to said first determination value.

10. The method of controlling ignition timing of the internal combustion engine according to claim 6, wherein
    said step of controlling the ignition timing of said internal combustion engine includes a step of controlling the ignition timing to be retarded when said knock magnitude is greater than said first determination value, and
    said step of correcting said first determination value includes a step of correcting said first determination value so that said first determination value becomes smaller.

11. A device for controlling ignition timing of an internal combustion engine, comprising:
    detecting means for detecting for a plurality of times a magnitude of vibration occurring in said internal combustion engine;
    first calculating means for calculating a knock magnitude related to a magnitude of vibration due to knocking, in accordance with each said magnitude detected by said detecting means;
    controlling means for controlling ignition timing of said internal combustion engine, based on a result of comparison between said knock magnitude and a predetermined first determination value;
    second calculating means for calculating a median value and a standard deviation of said magnitudes detected by said detecting means; and correcting means for correcting said first determination value so that degree of ignition timing being retarded by said controlling means becomes greater when a second determination value calculated by adding a product of said standard deviation and a predetermined coefficient to said median value is greater than said first determination value.

12. The device for controlling ignition timing of the internal combustion engine according to claim 11, further comprising third calculating means for calculating a third determination value greater than said first determination value, based on said first determination value, wherein said correcting means includes means for, when said second determination value is greater than said first determination value since said second determination value is greater than said third determination value, correcting said first determination value so that the degree of the ignition timing being retarded by said controlling means becomes greater.

13. The device for controlling ignition timing of the internal combustion engine according to claim 12, wherein said third calculating means includes means for calculating said third determination value by multiplying said first determination value by a predetermined value.

14. The device for controlling ignition timing of the internal combustion engine according to claim 12, wherein said third calculating means includes means for calculating said third determination value by adding a predetermined value to said first determination value.

15. The device for controlling ignition timing of the internal combustion engine according to claim 11, wherein said controlling means includes means for controlling the ignition timing to be retarded when said knock magnitude is greater than said first determination value, and said correcting means includes means for correcting said first determination value so that said first determination value becomes smaller.

* * * * *